United States Patent

[11] 3,623,153

| [72] | Inventors | Rodney Hayden<br>Stoney Creek, Ontario;<br>Mario Guarasci, Niagara Falls, Ontario,<br>both of Canada |
|---|---|---|
| [21] | Appl. No. | 820,095 |
| [22] | Filed | Apr. 29, 1969 |
| [45] | Patented | Nov. 23, 1971 |
| [73] | Assignee | TRW Inc.<br>Cleveland, Ohio |
| [32] | Priority | Dec. 26, 1968 |
| [33] | | Canada |
| [31] | | 038,724 |

[54] ON-CIRCUIT BUZZER DEVICE WITH BUCKING FOR AUTOMOBILES COIL CANCEL
2 Claims, 3 Drawing Figs.

[52] U.S. Cl. .................................................. 340/52 D,
180/111, 307/10 BP
[51] Int. Cl. .................................................. B60q 5/00
[50] Field of Search.......................................... 340/52 D;
307/10 BP; 180/111, 103

[56] References Cited
UNITED STATES PATENTS
| 3,172,080 | 3/1965 | Webb et al. .................. | 340/52 D |
| 2,507,398 | 5/1950 | Castro .......................... | 340/52 D |

OTHER REFERENCES
Schneider, Norman H., How to Install Electric Bells, Annunicators, and Alarms, pp. 10– 11, New York, Spon & Chamberlain, 1913. TK 7019 535 (copy in Scientific Library)

*Primary Examiner*—Donald J. Yusko
*Assistant Examiner*—Glen R. Swann, III
*Attorneys*—Philip E. Parker, Gordon Needleman, James R. O'Connor, John Todd and Hall & Houghton ABSTRACT: This is an on-circuit buzzer device for automotive use which utilizes a pair of coils in electrical bucking arrangement to operate a buzzer when certain conditions are met. The device uses the bucking arrangement as a cancelling means.

PATENTED NOV 23 1971 3,623,153

INVENTORS
RODNEY HAYDEN
MARIO GUARASCI

BY *Gordon Needleman*
ATTORNEY

ON-CIRCUIT BUZZER DEVICE WITH BUCKING FOR AUTOMOBILES COIL CANCEL

SUMMARY OF THE INVENTION

This invention relates to an on-circuit buzzer device for automotive use.

Any one number of electrical circuits which are independent of the ignition circuit can be left on by the operator through inadvertence. A head lamp circuit of an automobile is typical of the on-circuit condition which can arise if the operator fails to turn off the headlights when leaving the automobile after turning off the ignition.

Prior on-circuit warning devices embody a plurality of relays and generally continue a warning signal after the operator has closed the door of the automobile.

It is an object of the invention to provide an on-circuit buzzer signal device for automobiles which is responsive to the ignition circuit and a control circuit whereby the same is active only when the ignition is off and the control circuit is closed such as by a door switch closed when a door is open only.

DESCRIPTION OF THE EMBODIMENTS

According to the invention the functions required are satisfied by a buzzer-type relay having two equal core windings connected to three terminals in such manner that closing of the normally open contacts of the relay by energizing one of the coils connects said one coil in short circuit or alternatively magnetically short circuits said coil by connecting the other of said coils in magnetic bucking relationship therewith.

Figure 1:
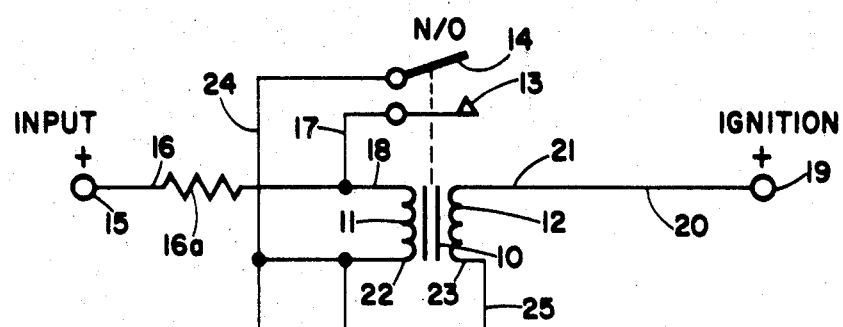
FIG. 1 is a circuit diagram of one form of the invention.

Thus in FIG. 1 relay core 10 having two equal windings 11 and 12 thereon is adapted when magnetically energized to close normally open buzzer or relay contacts 13 and 14. Terminal 15 is connectable to plus voltage of a lamp or other ignition independent circuit from which an inadvertence warning signal may be required and is in circuit by lines 16 resistor 16a and line 17 with one of the relay contacts 13 and one lead 18 of one of the windings 11.

Ignition terminal 19 is connectable to the positive voltage of the ignition circuit and is connected by line 20 with one lead 21 of the other winding 12 and other contact 14 and the other ends 22, 23 of windings 11 and 12 are commonly connected by lines 24, 25 to control terminal 26 connectable through a normally open control switch 27 such as a door switch to chassis ground 28.

In operation the circuit is inactive while the ignition is on because closure of switch 27 will energize only coil 12 holding contacts 13, 14 closed if there is no voltage at input terminal 15. If voltage is at terminal 15 when ignition is on then contacts 13, 14 will not close because windings 11 and 12 in such circuit circumstance are in bucking relationship. Resistance 16a in input line 16 in FIG. 1 prevents short circuiting the input terminal to ground 28 when contacts 13 and 14 are closed.

Figure 2:
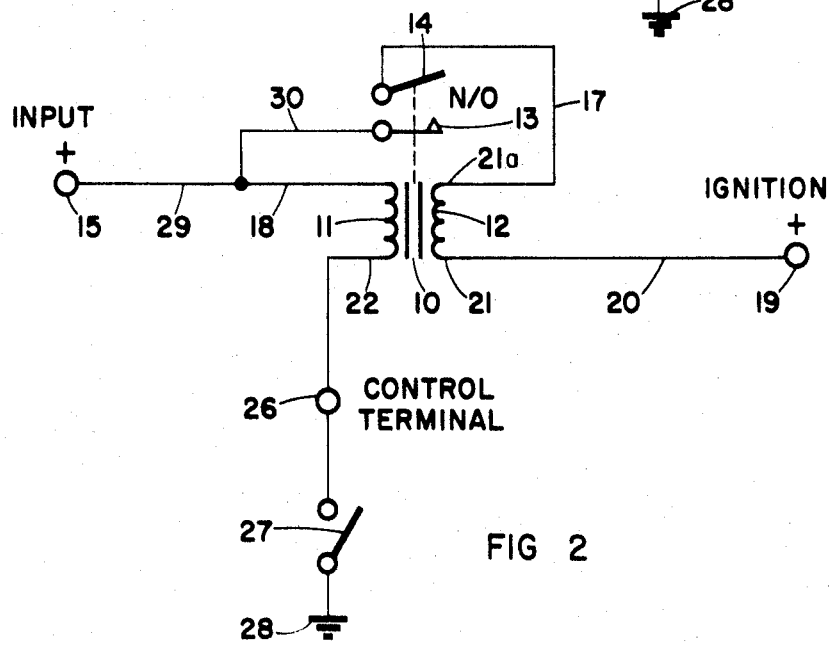
FIG. 2 is a circuit diagram of another form of the invention.

The circuit of FIG. 2 by way of alternative utilizes the same numerals to identify the same components, the latter being identical to those of FIG. 1 but the circuit connection being different. In this case when the ignition circuit is off it must be remembered that the unenergized ignition circuitry (pilot lights, etc.) to which terminal 19 connects totals about 3 ohms resistance to chassis (ground). Accordingly windings 11, 12 each being of about 100 ohms direct current resistance, terminal 19 serves as effective ground when the ignition is off. Under these conditions terminal 15 is in circuit by lines 29, 30 with one of the relay contacts 13 and one lead 18 of one of the windings 11. Ignition terminal 19 is connected by line 20 with one lead 21 of the other winding 12, the other contact 14 is connected to the other end 21a of winding 12 while the other end 22 of winding 11 connects to control terminal 26.

In operation closure of control switch 27 and voltage at input terminal 15 will energize coil 11 closing contacts 13, 14 if ignition is off. Under the latter condition effective ground through terminal 19 energizes winding 12 in bucking relationship to winding 11 to open contacts 13, 14. If ignition circuit is on then closure of contacts 13, 14 will connect winding 12 in reverse current direction through the contacts and winding 11 in aiding relationship to chassis ground through control switch 27. Thus in the circuit of FIG. 2 the windings are in bucking relationship when the ignition is off and in series-aiding relationship when the ignition is on. The bucking circuit enables a buzzing function whereas the contacts are clamped closed in series circuit when the ignition is on whereby no sound signal is generated.

Figure 3:
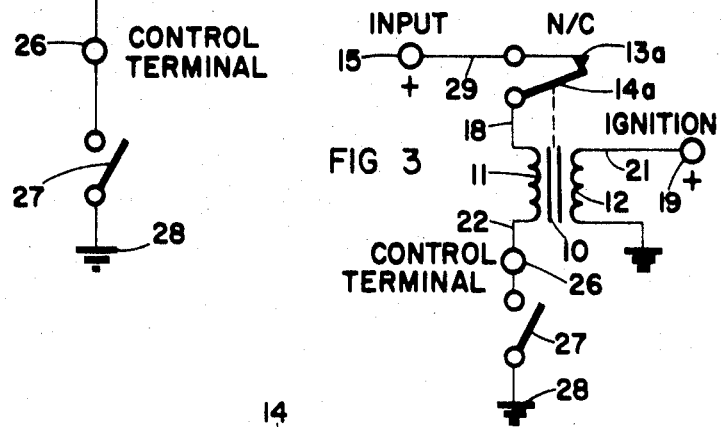
FIG. 3 is a circuit diagram of a further form of the invention.

FIG. 3 is an alternative to both FIGS. 1 and 2 being a magnetic flux shorting or bucking circuit with a normally closed relay as opposed a normally open relay. In the generic aspect of FIG. 3 normally closed relay contacts 13a, 14a energize winding 11 when control switch 27 is closed if the winding 12 is energized by plus voltage from the ignition circuit through the terminal 19 then this voltage on the winding 12 will prevent the relay contacts 13a and 14a from acting as a buzzer. With no voltage at 19 relay 11 is controlled in normal buzzing function by make and break of contacts 13a, 14a.

We claim:

1. An electric buzzer relay-type device for automotive use comprising a buzzer electric relay having a core, a normally open pair of contacts, a first winding and a second winding on said core, the first winding connected to an input and to a switch connected to ground, and the second winding connected to a terminal and to the switch and to the first winding, one of the contacts connected to one end of the first winding and the other connected to the other end of the first winding whereby a plus voltage on the input with the switch closed and the terminal having no voltage thereon will cause the buzzer to operate.

2. The device of claim 1 in which said terminal is connected to an automotive ignition circuit and the ohmic resistance of the device is greater than 100 ohms whereby the ignition circuit in the off condition serves as effective chassis ground.

* * * * *